US011301233B2

(12) United States Patent
Li et al.

(10) Patent No.: US 11,301,233 B2
(45) Date of Patent: Apr. 12, 2022

(54) PERMISSION-CONTROLLED SMART CONTRACT UPGRADE METHOD BASED ON SMART CONTRACT

(71) Applicant: HANGZHOU QULIAN TECHNOLOGY CO., LTD., Hangzhou (CN)

(72) Inventors: Wei Li, Hangzhou (CN); Weiwei Qiu, Hangzhou (CN); Keting Yin, Hangzhou (CN); Qilei Li, Hangzhou (CN); Jialei Rong, Hangzhou (CN); Zhiqiang Wu, Hangzhou (CN)

(73) Assignee: HANGZHOU QULIAN TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/762,154

(22) PCT Filed: Aug. 30, 2019

(86) PCT No.: PCT/CN2019/103502
§ 371 (c)(1),
(2) Date: May 7, 2020

(87) PCT Pub. No.: WO2020/082897
PCT Pub. Date: Apr. 30, 2020

(65) Prior Publication Data
US 2020/0394032 A1    Dec. 17, 2020

(30) Foreign Application Priority Data

Oct. 24, 2018    (CN) .......................... 2018112426291

(51) Int. Cl.
*G06F 8/65* (2018.01)
*G06F 16/23* (2019.01)
(Continued)

(52) U.S. Cl.
CPC ............ *G06F 8/65* (2013.01); *G06F 16/2379* (2019.01); *G06F 21/57* (2013.01); *G06Q 10/10* (2013.01);
(Continued)

(58) Field of Classification Search
CPC ........................................................ G06F 8/65
See application file for complete search history.

(56) References Cited

U.S. PATENT DOCUMENTS 5,751,909 A    5/1998    Gower
10,871,948 B1 *    12/2020    Dowling .............. H04L 9/3239
(Continued)

FOREIGN PATENT DOCUMENTS

CN    107103473 A    8/2017
CN    107464148 A    12/2017
(Continued)

OTHER PUBLICATIONS

Extended European Search Report(dated Sep. 17, 2021).
(Continued)

*Primary Examiner* — Jae U Jeon
(74) *Attorney, Agent, or Firm* — W&G Law Group

(57) ABSTRACT

The present disclosure provides a permission-controlled smart contract upgrade method based on a smart contract. The method first deploys a contract upgrade smart contract, and then deploys a smart contract to be upgraded including information of contract participants and information of a required minimum number of agreements on passing a proposal related to the contract. Then any of the blockchain nodes receives a contract upgrade proposal submitted by a user to the contract upgrade smart contract, the contract upgrade proposal carrying an address of the smart contract to be upgraded and binary information of a new contract. After the contract upgrade smart contract determines to pass the proposal, a proposing event is generated and then is forwarded to each user client participating in the contract. After the client receives the proposing event, the client receives user's vote and feeds it back to the contract upgrade smart contract. If the number of agreements exceeds the required minimum number of agreements, the proposal is (Continued)

passed and employed, and a binary replacement is performed to complete upgrade of the smart contract. The present disclosure solves a problem of centralization of the traditional contract upgrade, solves a problem of single point of failure, and improves a security of contract upgrade.

5 Claims, 1 Drawing Sheet

(51) Int. Cl.
G06F 21/57 (2013.01)
G06Q 10/10 (2012.01)
G06Q 30/00 (2012.01)
G06Q 50/18 (2012.01)

(52) U.S. Cl.
CPC ......... *G06Q 30/0185* (2013.01); *G06Q 50/18* (2013.01); *G06F 2221/033* (2013.01); *G06Q 2230/00* (2013.01)

(56) References Cited

U.S. PATENT DOCUMENTS

| | | | |
|---|---|---|---|
| 2017/0279774 A1* | 9/2017 | Booz | G06Q 20/123 |
| 2018/0020324 A1* | 1/2018 | Beauford | H04L 43/10 |
| 2018/0123779 A1* | 5/2018 | Zhang | H04L 9/0637 |
| 2019/0384748 A1* | 12/2019 | Roennow | G06F 21/64 |

FOREIGN PATENT DOCUMENTS

| | | |
|---|---|---|
| CN | 107844704 A | 3/2018 |
| CN | 108170449 A | 6/2018 |
| CN | 108196872 A | 6/2018 |
| CN | 109358881 | 2/2019 |

OTHER PUBLICATIONS

"EIP-1504: Upgradable Smart Contract" (Oct. 17, 2018).
International Search Report (PCT/CN2019/103502); dated Nov. 27, 2019.

* cited by examiner

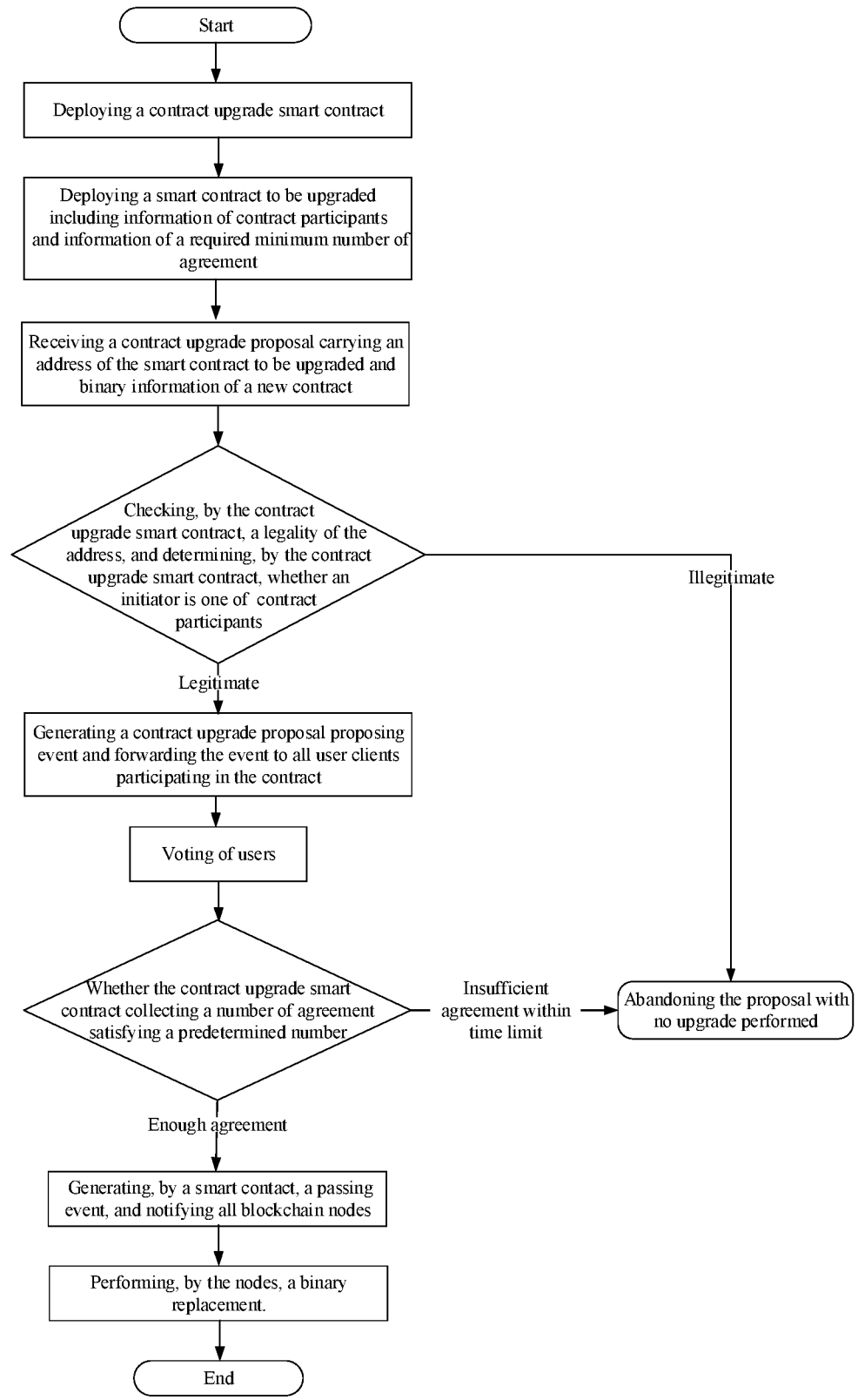

PERMISSION-CONTROLLED SMART CONTRACT UPGRADE METHOD BASED ON SMART CONTRACT

TECHNICAL FIELD

The present disclosure relates to the smart contract technologies, and particularly, to a permission-controlled smart contract upgrade method based on a smart contract.

BACKGROUND

Smart contract is a concept proposed by Nick Saab in the 1990s and is almost the same age as the Internet. Due to the lack of a trusted execution environment, the smart contract is not applied to the actual industry. Since the birth of Bitcoin, people have realized that Bitcoin's underlying technology, the blockchain, can inherently provide a trusted execution environment for the smart contract. The smart contract is an assembly language programmed on the blockchain. Generally, people do not write bytecode by themselves, but they compile it with a higher level language.

In the traditional blockchain smart contract upgrade, an update request is initiated by the deployer, and the contract can be directly upgraded. In the alliance chain system, such design has the following problems: a problem of a single point of failure, in which a contract can no longer be upgraded if the deployer loses his private key; and a problem of breach, under which a smart contract may involve multiple participants and the deployer can unilaterally upgrade the contract without the consent of the remaining participants.

SUMMARY

Aiming at the deficiency of the prior art, the present disclosure provides a permission-controlled smart contract upgrade method based on a smart contract, which provides a permission control for the smart contract upgrade and enhances the security. The specific technical solutions are as follows:

A permission-controlled smart contract upgrade method based on a smart contract, the blockchain including a plurality of blockchain nodes and a plurality of clients, wherein the method includes steps of:

step S1 of deploying a contract upgrade smart contract to the plurality of blockchain nodes;

step S2 of deploying a smart contract to be upgraded to the plurality of blockchain nodes, the smart contract to be upgraded including information of contract participants and information of a required minimum number of agreements on passing a proposal related to the contract;

step S3 of receiving, by one of the plurality of blockchain nodes, a contract upgrade proposal submitted by a user to the contract upgrade smart contract, the contract upgrade proposal carrying an address of the smart contract to be upgraded and binary information of a new contract; checking, by the contract upgrade smart contract, whether the address of the smart contract to be upgraded is legitimate and whether the proposal initiator of the smart contract to be upgraded is one of the contract participants, and confirming whether the address and the proposal initiator are legitimate; refusing, by the contract upgrade smart contract, the upgrade when the address or the proposal initiator is illegitimate; and generating, by the contract upgrade smart contract, a contract upgrade proposal proposing event and forwarding the event to each of the plurality of user clients participating in the contract when the address and the proposal initiator are both legitimate;

step S4 of after obtaining the contract upgrade proposal proposing event, receiving, by each of the plurality of user clients, voting information of a corresponding user based on corresponding information, and feeding back, by each of the plurality of user clients, the voting information to the contract upgrade smart contract;

S5: collecting, by the contract upgrade smart contract, a number of agreements; and determining that the proposal is passed, generating a passing event and notifying all of the plurality of the blockchain nodes when the number of agreements exceeds the required minimum number of agreements, or determining that the proposal is abandoned with no upgrade when an insufficient number of agreements has been collected within a time limit;

S6: performing, by each of the plurality of blockchain nodes, a binary replacement to complete upgrade of the smart contract.

Further, the contract upgrade smart contract simultaneously processes upgrade proposals of multiple contracts by adding mappings and processes in such a manner that only one upgrade proposal of one contract is processed at one time.

Further, in the step S3, said checking, by the contract upgrade smart contract, whether the proposal initiator is one of the contract participants, includes retrieving, using an internal contract, information of the contract participants based on the address of the contract to be upgraded.

Further, the information of contract participants of the smart contract to be upgraded and the information of the required minimum number of agreements on passing the proposal related to the contract are also capable of being updated by voting on proposals to adapt to an increase or a decrease of contract users.

Further, in said step S2 of deploying the smart contract to be upgraded, the information of contract participants of the smart contract to be upgraded and the information of the required minimum number of agreements on passing a proposal related to the contract need to be redundantly backed up in each of the plurality of blockchain nodes.

The beneficial effects of the present disclosure are as follows.

The permission-controlled smart contract upgrade method based on a smart contract according to the present disclosure performs a permission control to the contract upgrade, and the contract upgrade can be performed only when the consent of the predetermined number of contract participants is acquired, thereby avoiding a single point of failure and the possibility of breach and thus improving safety.

BRIEF DESCRIPTION OF DRAWINGS

FIG. 1 is a detailed flowchart of a permission-controlled smart contract upgrade method based on a smart contract according to the present disclosure.

DESCRIPTION OF EMBODIMENTS

The present disclosure is described in detail below with reference to the accompanying drawings and preferred embodiments, so that the objects and effects of the present disclosure will become clearer. The present disclosure will be further described in detail with reference to the drawings and embodiments. It should be understood that the specific embodiments described herein are only used to explain the present disclosure and are not intended to limit the present disclosure.

As shown in FIG. 1, a permission-controlled smart contract upgrade method based on a smart contract is illustrated. A blockchain includes blockchain nodes and clients. The method includes the following steps of:

S1: deploying a contract upgrade smart contract to the blockchain nodes;

S2: deploying a smart contract to be upgraded to the blockchain nodes, the smart contract to be upgraded including information of contract participants and information of a required minimum number of agreements on passing a proposal related to the contract;

S3: receiving, by any of the blockchain nodes, a contract upgrade proposal submitted by a user to the contract upgrade smart contract, the contract upgrade proposal carrying an address of the smart contract to be upgraded and binary information of a new contract; checking, by the contract upgrade smart contract, whether the address of the smart contract to be upgraded is legitimate and whether the proposal initiator of the smart contract to be upgraded is one of the contract participants, and confirming whether the address and the proposal initiator are legitimate, wherein if the address or the proposal initiator is illegitimate, the upgrade is refused, and if the address and the proposal initiator are both legitimate, generating, by the contract upgrade smart contract, a contract upgrade proposal proposing event and forwarding the event to each user client participating in the contract.

S4: after obtaining the contract upgrade proposal proposing event, receiving, by the user client, voting information determined by the user based on corresponding information, and feeding back, by the user client, the voting information to the contract upgrade smart contract;

S5: collecting, by the contract upgrade smart contract, a number of agreements, wherein when the number of agreements exceeds the required minimum number of agreements, the proposal is passed and a passing event is generated and then is notified to each blockchain node; if an insufficient number of agreements has been collected within a time limit, the proposal is abandoned and the upgrade is not performed;

S6: performing, by each blockchain node, a binary replacement to complete a smart contract upgrade.

Preferably, the contract upgrade smart contract simultaneously processes upgrade proposals of multiple contracts by adding mapping and processes in such a manner that only one upgrade proposal of one contract is processed at one time to adapt to a case in which multiple contracts are included by a system.

Preferably, in the step S3, said checking, by the contract upgrade smart contract, whether the proposal initiator of the smart contract to be upgraded is one of the contract participants includes: retrieving, using an internal contract, corresponding information of contract participants based on an address of a given contract to be upgraded.

Preferably, the information of contract participants of the smart contract to be upgraded and the information of a required minimum number of agreements on passing the proposal related to the contract are also capable of being updated by voting on proposals to adapt to a case of join or exit of contract users.

Preferably, in the step S2 of deploying the smart contract to be upgraded, the information of contract participants of the smart contract to be upgraded and the information of the required minimum number of agreements on passing a proposal related to the contract need to be redundantly backed up in each blockchain node.

Those of ordinary skill in the art can understand that the above description only illustrates preferred examples of the present disclosure and is not intended to limit the present disclosure. Although the disclosure has been described in detail with reference to the foregoing examples, it can be understood by those skilled in the art that the technical solutions described in the foregoing examples can still be modified, or make equivalent replacements to some technical features. Any modification, equivalent replacement, and the like, within the spirit and principle of the disclosure shall fall into the protection scope of the disclosure.

What is claimed is:

1. A permission-controlled smart contract upgrade method based on a smart contract, applied in a blockchain, the blockchain comprising a plurality of blockchain nodes and a plurality of clients,
wherein the method comprises steps of:
step S1 of deploying a contract upgrade smart contract to the blockchain;
step S2 of deploying a smart contract to be upgraded to the blockchain, the smart contract to be upgraded comprising information of contract participants and information of a required minimum number of agreements on passing a proposal related to the contract;
step S3 of receiving, by one of the plurality of blockchain nodes, a contract upgrade proposal submitted by a user to the contract upgrade smart contract, the contract upgrade proposal carrying an address of the smart contract to be upgraded and binary information of a new contract; checking, by the contract upgrade smart contract, whether the address of the smart contract to be upgraded is legitimate and whether a proposal initiator of the smart contract to be upgraded is one of the contract participants, and confirming whether the address and the proposal initiator are legitimate; refusing, by the contract upgrade smart contract, the upgrade when the address or the proposal initiator is illegitimate; and generating, by the contract upgrade smart contract, a contract upgrade proposal proposing event and forwarding the event to each of a plurality of user clients participating in the contract when the address and the proposal initiator are both legitimate;
step S4 of after obtaining the contract upgrade proposal proposing event, receiving, by each of the plurality of user clients, voting information of a corresponding user based on corresponding information, and feeding back, by each of the plurality of user clients, the voting information to the contract upgrade smart contract;
S5: collecting, by the contract upgrade smart contract, a number of agreements; and determining that the proposal is passed, generating a passing event and notifying all of the plurality of the blockchain nodes when the number of agreements exceeds the required minimum number of agreements, or determining that the proposal is abandoned with no upgrade when an insufficient number of agreements has been collected within a time limit; and
S6: performing, by each of the plurality of blockchain nodes, a binary replacement to complete upgrade of the smart contract.

2. The permission-controlled smart contract upgrade method based on a smart contract according to claim 1, wherein the contract upgrade smart contract simultaneously processes upgrade proposals of multiple contracts by adding mappings and processes in such a manner that only one upgrade proposal of one contract is processed at one time.

3. The permission-controlled smart contract upgrade method based on a smart contract according to claim 1, wherein in the step S3, said checking, by the contract upgrade smart contract, whether the proposal initiator is one of the contract participants, comprises retrieving, using an internal contract, information of the contract participants based on the address of the smart contract to be upgraded.

4. The permission-controlled smart contract upgrade method based on a smart contract according to claim 1, wherein the information of contract participants of the smart contract to be upgraded and the information of the required minimum number of agreements on passing the proposal related to the contract are also capable of being updated by voting on proposals to adapt to an increase or a decrease of contract users.

5. The permission-controlled smart contract upgrade method based on a smart contract according to claim 1, wherein in said step S2 of deploying the smart contract to be upgraded, the information of contract participants of the smart contract to be upgraded and the information of the required minimum number of agreements on passing a proposal related to the contract need to be redundantly backed up in each of the plurality of blockchain nodes.

\* \* \* \* \*